(12) United States Patent
Ivanov et al.

(10) Patent No.: US 8,996,944 B2
(45) Date of Patent: Mar. 31, 2015

(54) CLIENT-SERVER GAMING

(75) Inventors: Eugene Ivanov, Moscow (RU); Ivan M. Ogorodov, Moscow (RU); Alexander Zelenshikov, Moscow (RU)

(73) Assignee: Nival, Inc., Santa Monica, CA (US)

( * ) Notice: Subject to any disclaimer, the term of this patent is extended or adjusted under 35 U.S.C. 154(b) by 529 days.

(21) Appl. No.: 13/339,129

(22) Filed: Dec. 28, 2011

(65) Prior Publication Data
US 2013/0172079 A1    Jul. 4, 2013

(51) Int. Cl.
G06F 11/00 (2006.01)
A63F 13/30 (2014.01)
A63F 13/20 (2014.01)

(52) U.S. Cl.
CPC ............. *A63F 13/12* (2013.01); *A63F 13/06* (2013.01); *A63F 2300/50* (2013.01); *A63F 2300/407* (2013.01); *A63F 2300/64* (2013.01)
USPC ........................................... 714/746

(58) Field of Classification Search
CPC ..... H04L 1/0061; H04L 1/004; H03M 13/09; H03M 13/6306; H03M 13/37; H03M 13/15; H03M 13/05; H03M 13/11; H03M 13/1545; A63F 2300/50; A63F 13/12; A63F 13/10; A63F 2300/807; A63F 13/06; A63F 2300/1031; A63F 2300/105; A63F 2300/1062; A63F 2009/2489
USPC .................................................. 714/746, 748
See application file for complete search history.

(56) References Cited

U.S. PATENT DOCUMENTS

| | | | |
|---|---|---|---|
| 5,838,909 A | 11/1998 | Roy et al. | |
| 5,964,660 A | 10/1999 | James et al. | |
| 5,984,786 A | 11/1999 | Ehrman | |
| 6,031,818 A * | 2/2000 | Lo et al. | 370/216 |
| 6,126,548 A | 10/2000 | Jacobs et al. | |
| 6,405,259 B1 * | 6/2002 | Cheston et al. | 709/245 |
| 6,628,287 B1 | 9/2003 | Duda et al. | |
| 6,866,587 B1 * | 3/2005 | Lane | 463/43 |
| 6,932,708 B2 | 8/2005 | Yamashita et al. | |
| 7,127,653 B1 * | 10/2006 | Gorshe | 714/746 |
| 7,627,632 B2 | 12/2009 | Douceur et al. | |
| 7,824,268 B2 | 11/2010 | Harvey et al. | |
| 8,074,136 B2 * | 12/2011 | Yu et al. | 714/746 |
| 8,132,071 B2 * | 3/2012 | Hayashi | 714/751 |
| 8,181,077 B2 * | 5/2012 | Nassor et al. | 714/748 |
| 8,312,350 B2 * | 11/2012 | Fujimoto et al. | 714/775 |
| 8,489,742 B2 * | 7/2013 | Clubb et al. | 709/226 |
| 2006/0258462 A1 | 11/2006 | Cheng et al. | |
| 2007/0099703 A1 | 5/2007 | Terebilo | |
| 2010/0241692 A1 | 9/2010 | Klee et al. | |

FOREIGN PATENT DOCUMENTS

EP    1617615 A    1/2006

* cited by examiner

*Primary Examiner* — James C Kerveros
(74) *Attorney, Agent, or Firm* — The Mueller Law Office, P.C.

(57) ABSTRACT

In a client-server game system, or in accordance with a computer-readable program stored on a non-transitory computer-readable medium, a client participates in a game with other clients by performing an in-game simulation. Based on results of the in-game simulation, the client sends error-checking data to a server. The server analyzes the error-checking data to determine whether a simulation error has been caused by at least one of the clients. Upon determining that the simulation error has been caused, the server causes a reference simulation to be performed. Based on the results of the reference simulation, the server identifies the client(s) that caused the simulation error. The server then sends a patch to the client(s) that caused the simulation error. The client applies the patch to correct and reset the in-game simulation.

20 Claims, 8 Drawing Sheets

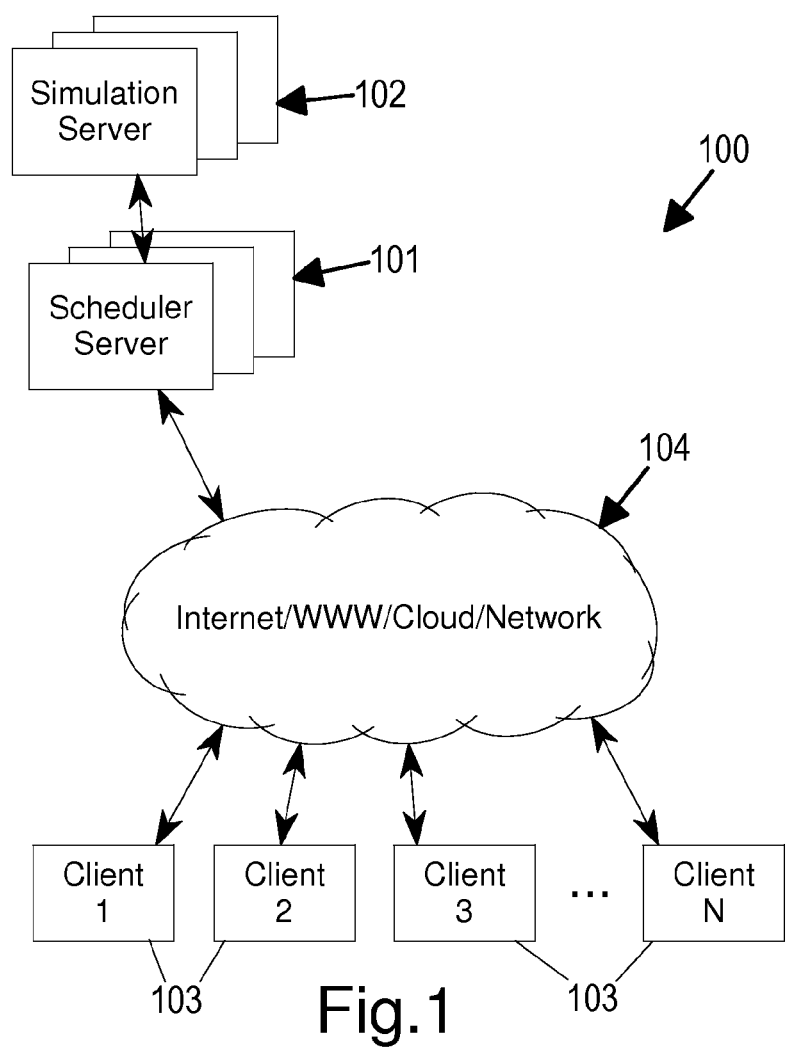
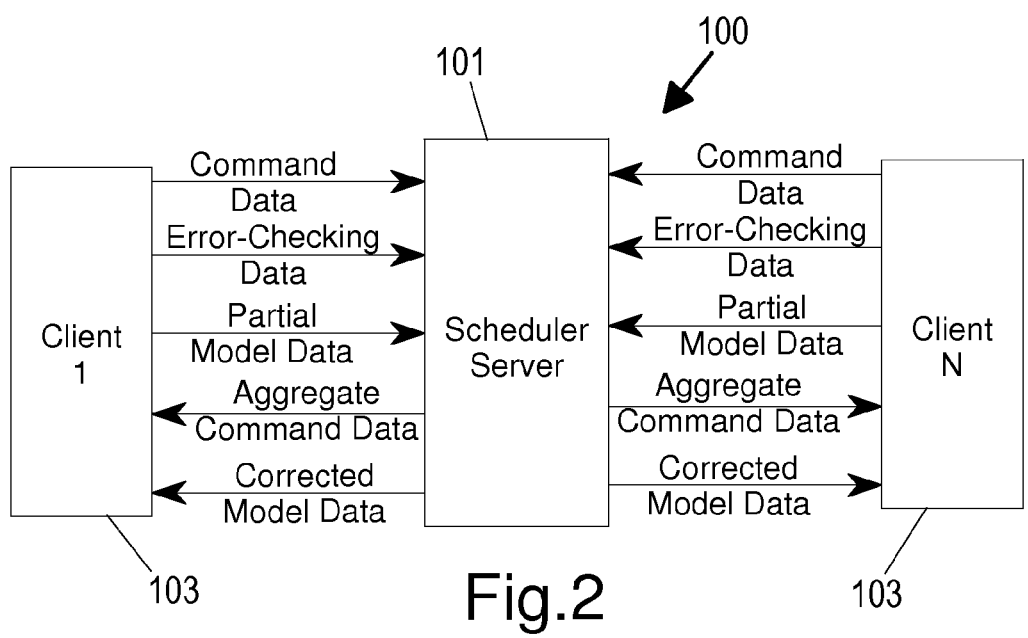

CLIENT-SERVER GAMING

BACKGROUND OF THE INVENTION

Many computer games allow multiple people (players, gamers, users, etc.) using networked computers (e.g. general purpose computers or dedicated game consoles) to participate in a game with or against each other through a network (e.g. a LAN, a WAN, the Internet, a direct cable or wireless connection, etc.). Such games are commonly based on variations of client-server architectures or peer-to-peer (P2P) architectures.

In a common P2P system, each computer may communicate directly with all of the other computers participating in the game. Additionally, each computer typically maintains its own model or simulation of the game and broadcasts its own command data to all the other computers through the network. Each computer, thus, updates its model based on commands of its player and all of the received command data.

In a client-server system, on the other hand, each computer client typically communicates through a server to the other computer clients that are participating in the same game. The server commonly manages a major portion of the computing workload for the game. For example, the server typically creates and controls the entire game or game world simulation and communicates the state of the game to the client computers. The client computers typically render the game for the players and transmit player actions back to the server for continued game simulation.

In general, client-server systems and P2P systems (and variations or hybrids thereof) have various strengths and weaknesses that must be considered when designing an online or networked game and deciding what type of architecture to use. There are some considerations that apply to all networked games.

Major considerations for all networked game designs, for example, include the level of communication traffic that the game will impose on the network and the network's speed and bandwidth capabilities. After all, the game will not be fun for the players if the network cannot handle the necessary size and number of communication packets that must be shared in order to play the game. For many networked games, however, the various players may access the network (e.g. the Internet) through an unknown number and variety of communication devices (e.g. routers, hubs, repeaters, modems, adapters, etc.), each having an unknown communication speed or bandwidth. To make the game playable or enjoyable for the most number of players, therefore, network traffic usually must be minimized.

In client-server systems (or hybrid systems, such as P2P systems in which one of the computers doubles as a sort of server), another significant consideration is the level of the workload on the server. In a typical example client-server system, the server may handle all, or a large portion, of the compute-intensive game world simulation functions, while the clients only have to render the results received from the server, among other less compute-intensive functions. In this case, a player may use almost any relatively cheap computer for a client, and the game is thus potentially accessible to a wide audience. In another example client-server system, simulations are caused by each client, as well as by the server. However, the server maintains the "true" or correct state of the simulation. To maintain a consistent game simulation across all the clients, the server periodically resynchronizes the states of the clients by sending a message indicating the correct state of the simulation to all clients. In either example, the server often must be a relatively expensive high-powered computer to handle the highly processor/memory-intensive functions necessary for many of today's multiplayer online games. A gaming business entity may, thus, assemble a large and very expensive server farm for its customers to access. To make a client-server-based game profitable for the business entity and affordable for its customers, therefore, server workload usually must be minimized.

Another significant consideration is rapid and accurate error detection and correction. This issue is especially (but not exclusively) significant in P2P systems in which each computer performs its own simulation of the game and in client-server system in which a portion of the simulation functions are performed by the clients, instead of the server, or the clients duplicate all or part of the simulation performed by the server. With such decentralized game simulation, there is a relatively high potential for discrepancies occurring between different simulations of the game. It is thus necessary for such errors to be detected early and corrected quickly for the players to have an acceptable game experience. If a game system has no feature for correcting errors, then the players may find that they are playing completely different games due to the discrepancy, and the game may suddenly terminate, leaving the players frustrated and highly disappointed with the game.

It is with respect to these and other background considerations that the present invention has evolved.

BRIEF DESCRIPTION OF THE DRAWINGS

FIG. 1 is a simplified diagram of an example client-server system incorporating an embodiment of the present invention.

FIG. 2 is a simplified diagram of a different logical representation of the example client-server system shown in FIG. 1 showing example data communication, according to an embodiment of the present invention.

DETAILED DESCRIPTION OF THE INVENTION

Figure 3:
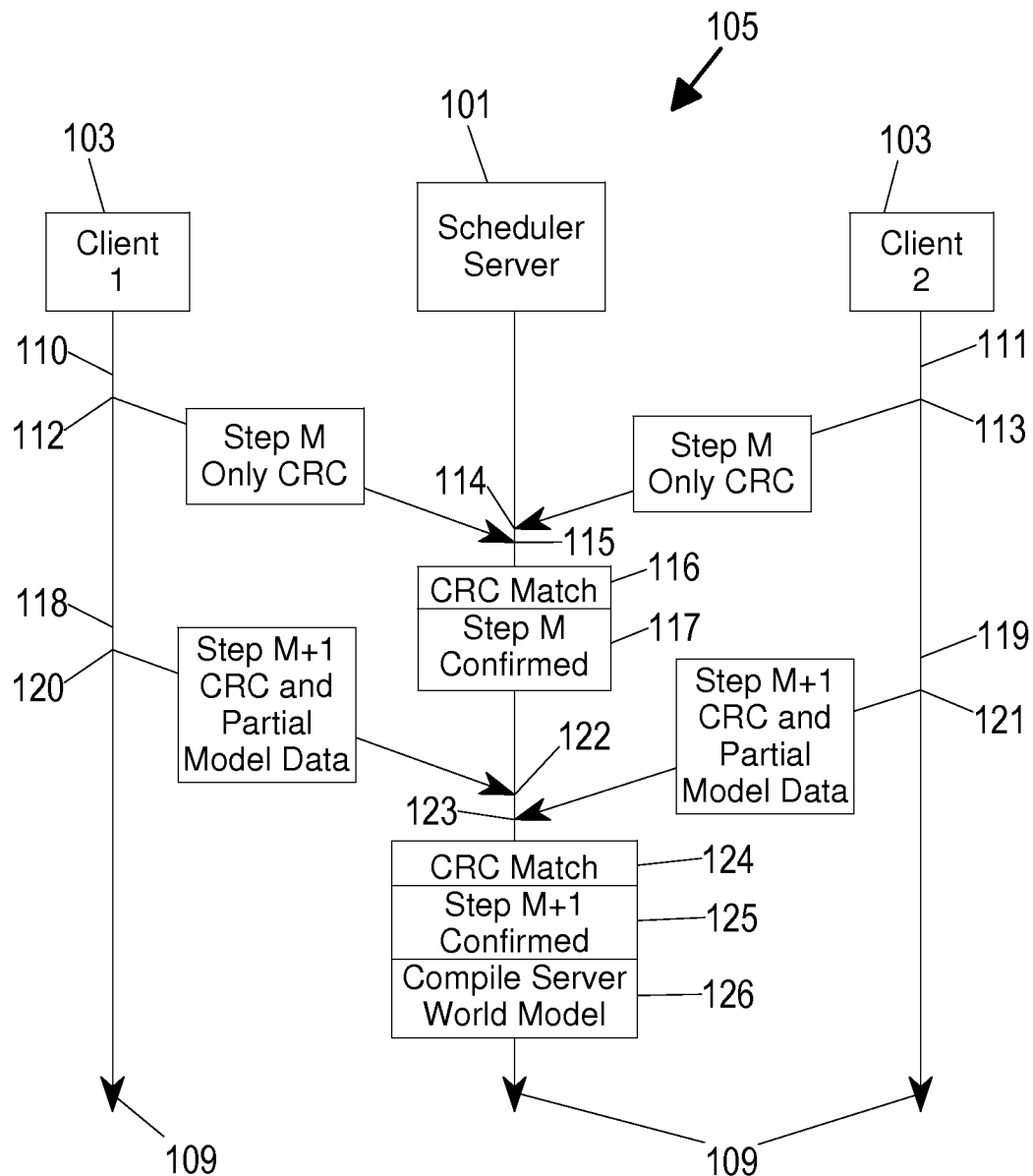
FIGS. 3-6 are simplified timeline diagrams for example functions within the example client-server system shown in FIG. 1, according to an embodiment of the present invention.

An example client-server system 100, incorporating an embodiment of the present invention, is shown in FIG. 1. The client-server system 100 generally includes servers 101 and 102 (referred to as a scheduler server 101 and a simulation server 102, and which may be one or more physical machines/computers) and a variety of clients 103 (e.g. computers or computerized devices, such as desktop computers, notebook computers, tablet computers, palm computers, cell phones, smart phones, iPhones, game consoles connected to televisions/displays, all-in-one game consoles, hand-held game devices, iPods, iPads, etc.) connected by a network 104 (e.g. the Internet, the World Wide Web, a cloud, a LAN, a WAN, etc.). The clients 103 generally have at least a display and a control device with which users (e.g. players, gamers, etc.) of the clients 103 generally play one or more networked or online computerized games with or against each other through the network 104. The games generally involve a model of a virtual world in which the players are participating and which is presented to the players through the displays of the clients 103. The clients 103 have no direct connections between each other, so the scheduler server 101 generally manages the game play by forwarding the players' command data between the clients 103. The scheduler server 101 also maintains game data (as described below), but does not usually perform a simulation of the world model for the game. Instead, each of the clients 103 maintains and performs its own in-game simulation of the world model for presentation to the players through the displays of the clients 103. It is only when a simulation error is detected that the scheduler server 101 may initiate a reference simulation (using the simulation server 102), which is performed only to determine how to correct the error (i.e. to determine the correct state of the world model), as described below.

In this manner, the workload of the scheduler server 101 and the simulation server 102 is generally minimized, since the servers 101 and 102 do not simulate the world model all the time, but only during a recovery mode (described below). Additionally, network communication traffic is also generally minimized, since a significant amount of simulation data does not have to be transmitted through the network very often, but only when an error needs to be corrected. Furthermore, the error detection and correction method (described below) can be performed relatively quickly, resulting in minimal interruption to the users' game play.

FIG. 2 illustrates the primary types of data communications made between the scheduler server 101 and the clients 103 in accordance with embodiments of the present invention. The simulation server 102 is not shown in FIG. 2 since its function is generally transparent to the clients 103. Additionally, although only two clients 103 and one scheduler server 101 are shown, it is understood that any number of clients 103 may be used, and the scheduler server 101 may comprise any appropriate or necessary number of physical and/or virtual machines.

Each client 103 generally sends command data, error-checking data and partial model data, among other possible types of data, to the scheduler server 101. Additionally, the scheduler server 101 generally sends aggregate command data and corrected model data (e.g. a model patch), among other possible types of data, to the clients 103.

At least some of the command data is generally sent in response to inputs, commands or actions made by the user by manipulating the control device of the client 103, e.g. a keyboard, mouse, pointing device, game controller, joystick, control pad, touch pad, touch-sensitive display or other appropriate type of input or control device. Other command data, in some embodiments, may be generated by the client 103 as part of the in-game simulation and represent selections made by the client 103, rather than actions made by the user. For example, some of the commands may represent instructions for a player's avatar to move, to cast a magic spell, to attack an enemy, to pick up an item or to communicate with a non-playing character or another player. Some command data may simply represent various keystrokes, mouse movements or joystick toggles.

The command data is generally sent from each client 103 to the scheduler server 101 for the scheduler server 101 to join the command data together into the aggregate command data. The scheduler server 101 periodically sends the aggregate command data to the clients 103 for the clients 103 to progress each of their in-game simulations of the world model (i.e. client world models) for the game.

The in-game simulations of the clients 103 are generally performed in a series of steps that occur with a specified frequency (i.e. number of steps per second), so that each in-game simulation in each client 103 proceeds the same. Therefore, each packet of command data from the clients 103 may represent one or more inputs, actions or selections made during one or more simulation steps in the sending client 103. Each packet of aggregate command data, on the other hand, may represent one or more inputs, actions or selections made during one or more corresponding simulation steps in all of the clients 103.

The clients 103 parse the individual commands from the aggregate command data. Each client 103 then uses the commands to perform its in-game simulation to progress through one or more simulation steps in its world model.

At the end of each simulation step (or an appropriate number of simulation steps, e.g. based on a desired frequency for sending error-checking data), each client 103 generates the error-checking data based on the then current state of the client world model. The error-checking data is preferably any appropriate type of cyclic redundancy check (CRC) data and/or checksum data that can adequately represent a sufficient level of detail of the state of the client world model.

The error-checking data is sent by the clients 103 to the scheduler server 101 for the scheduler server 101 to analyze to determine whether any one or more of the clients 103 has potentially performed a simulation error. The scheduler server 101 generally does this analysis by comparing the error-checking data from all of the clients 103 to determine whether it all matches. If all the error-checking data matches, then the states of all the client world models at the end of the corresponding simulation step are considered to be the same, which means that the in-game simulations of the clients 103 have thus far proceeded the same. A mismatch in the error-checking data, however, indicates that the states of the client world models at the end of the given simulation step are not all the same. The implication of this situation is that at least one of the clients 103 may have performed an error in its in-game simulation, e.g. due to receiving faulty aggregate command data, losing some command data, attempting to cheat (e.g. generate counterfeit command data) or some other possible cause.

Although the above described usage of the error-checking data is considered to be very effective and efficient, it is understood that the present invention is not necessarily limited to embodiments incorporating this error determination technique or to embodiments that use CRC and/or checksum data. Rather, some embodiments of the present invention may use any appropriate technique for determining that not all of the clients 103 participating in a given game have generated the same simulation results.

In some embodiments, the clients 103 generate the partial model data at the end of each simulation step along with the error-checking data. However, it is preferable in some embodiments not to generate the partial model data with every simulation step, but only after some appropriate number of simulation steps. Additionally, in some embodiments, the partial model data is simply not generated as often as the error-checking data.

The partial model data of each client 103 generally represents, or is indicative of, at least a part of the client world model simulated by the client 103. The part of the client world model involves at least the part that the in-game simulation by the client 103 has affected in the simulation steps since any previous partial model data was generated.

The partial model data is sent by the clients 103 to the scheduler server 101 typically, but not necessarily, along with the error-checking data. The scheduler server 101 uses the partial model data from all the clients 103 to compile its own version of the world model (i.e. a server world model). The scheduler server 101 does not maintain its server world model as an ongoing simulation for the game. Instead, the scheduler server 101 merely periodically updates or compiles the server world model whenever it has the partial model data from all of the participating clients 103 for a given simulation step, as if periodically taking a "snapshot" of the world model, as described below.

The corrected model data (or world model patch) is sent by the scheduler server 101 whenever a simulation error has occurred (e.g. whenever the error-checking data does not match). The scheduler server 101 causes a reference simulation (described below) to be performed in the simulation server 102 upon determining that a simulation error has occurred. The reference simulation generally simulates only a most recent portion of the game using the latest compiled server snapshot of the world model and any command data and (optionally) partial model data received after the server world model was compiled. Based on the results of the reference simulation and the data received from the clients 103, the scheduler server 101 identifies which one or more of the clients 103 (i.e. the failed clients 103) may have performed the simulation error and generates the corrected model data that is needed for each failed client 103 to correct or reset the state of its client world model.

As an alternative, instead of performing the reference simulation upon determining that a simulation error has occurred, the scheduler server 101 may fetch the most recent confirmed snapshot of the model data from one of clients 103 and forward it to the other clients 103. This alternative may depend on the overall model data size, but may sometimes be more efficient than performing the reference simulation. This alternative may relieve the work load on the scheduler server 101 and/or the simulation server 102 at the cost of a temporary increase in network communication traffic. This tradeoff between server work load and network communication traffic may be beneficial in situations wherein one or both of the servers 101 and 102 is experiencing a relatively heavy work load, such that initiating the reference simulation or identifying the failed client 103 would put an undesirably heavier work load of either of the servers 101 or 102. To implement this alternative, one or more of the clients 103 may provide for storing of the most recent confirmed step, and the scheduler server 101 may provide confirmation information to such clients 103, while also keeping track of the work load of the servers 101 and 102 and the client 103 with the fastest transmission time.

When any of the clients 103 receives the corrected model data, it applies the indicated correction to correct and reset its in-game simulation or state of its client world model. The user of that client 103 may then experience a corrective jump in the game play as the user's avatar and/or point of view and/or some of the other avatars, non-playing characters and/or objects suddenly move to correct positions. The game play then proceeds from this corrected state.

FIGS. 3, 4, 5 and 6 show example timeline diagrams 105, 106, 107 and 108 for example actions or functions that the servers 101 and 102 and clients 103 may perform, according to some embodiments of the present invention. In these Figs., timeline arrows 109 generally represent the progress of time for each server 101 or 102 or client 103 shown. It is understood that these examples are used for illustrative purposes only and that the use of other actions or functions or combinations thereof may occur and other numbers of the servers 101 and 102 and clients 103 may be used within the scope of the present invention. Additionally, FIGS. 3, 4, 5 and 6 show relatively few events occurring during the time periods covered. However, in a real game situation, many events can occur at almost the same time. To illustrate the full complexity of such game play would require timeline diagrams with many overlapping lines. For clarity, therefore, relatively few events are shown in each timeline diagram 105-108.

For the timeline diagram 105 of FIG. 3, the scheduler server 101 and two clients 103 are shown communicating the error-checking data and the partial model data for a game. In this example, the two clients 103 have performed corresponding simulation steps in their respective in-game simulations of their client world models. (The corresponding simulation steps are referred to as step M for both clients 103.) For step M, each client 103 generates (at times 110 and 111) CRC data (i.e. the error-checking data) based on the state of its client world model that results from its in-game simulation. The clients 103 send (at times 112 and 113) only this data to the scheduler server 101.

The scheduler server 101 receives (at times 114 and 115) the CRC data from the clients 103. Since the scheduler server 101 has received the CRC data for step M from all participating clients 103 at this time, the scheduler server 101 compares the CRC data together and determines, in this example, that the CRC data match (at time 116), thus determining that no simulation error occurred in either client 103 for step M. The scheduler server 101 then marks step M as confirmed (at time 117).

In some embodiments, the scheduler server 101 performs the comparison of the CRC data for a given simulation step only after the CRC data has been received from all participating clients 103 for that simulation step. In other embodiments, the scheduler server 101 does not perform the comparison of the CRC data for a given simulation step until all expected data, not just the CRC data, has been received from all participating clients 103 for that simulation step. In this case, the workload of the scheduler server 101 may be reduced, but the CRC data comparison and subsequent actions may be delayed. In other embodiments involving more than two clients 103, however, the scheduler server 101 may perform the comparison of the CRC data for a given simulation step as soon as the CRC data has been received from any two or more participating clients 103 for that simulation step. Then when later-arriving CRC data is received for that simulation step, a portion of the comparison will already have been performed, so the final comparison can occur earlier and more quickly and any subsequent reference simulation can begin earlier. Additionally, a potential simulation error between the early-reporting clients 103 can be discovered earlier. Then the reference simulation can begin earlier, and the final comparison with the later-arriving CRC data need not even occur. In this case, however, the overall workload of the scheduler server 101 may be increased if on average the CRC data comparisons occur more often, but the subsequent actions may begin and end sooner, resulting in a better game performance experience for the users.

After times 112 and 113, and while the CRC data is being communicated to the scheduler server 101 and the scheduler server 101 is analyzing the CRC data, the clients 103 are most likely continuing to perform their in-game simulations. Therefore, by times 118 and 119, the clients 103 have performed at least one more simulation step (step M+1) (depending on network latency between the scheduler server 101 and the clients 103), so the clients 103 generate the CRC data for this simulation step. In this example, the clients 103 also generate (at times 118 and 119) the latest partial model data.

The clients 103 then send (at times 120 and 121) the CRC data and the partial model data to the scheduler server 101.

Since the clients 103 continue to perform their in-game simulations and generate and send their various data while the scheduler server 101 is analyzing previously sent data, the error-checking scheme may be referred to as a delayed simulation error-checking scheme. The period of time of the delay generally depends on the current workload of the servers 101 and 102. Additionally, this overlap in functions of the clients 103 and the scheduler server 101 (and optionally the simulation server 102) allows for an effective or efficient overall hardware usage.

The scheduler server 101 receives (at times 122 and 123) the CRC data and the partial model data from the clients 103. Since the scheduler server 101 has received the CRC data for step M+1 from all participating clients 103 at this time, the scheduler server 101 then compares the CRC data together and determines, in this example, that the CRC data match (at time 124), thus determining that no simulation error occurred in either client 103 for step M+1. The scheduler server 101 then marks step M+1 as confirmed (at time 125). Additionally, since the scheduler server 101 has received the partial model data from all participating clients 103 at this time, the scheduler server 101 also compiles (at time 126) the server world model, which represents the full model data at the end of step M+1.

Figure 4:
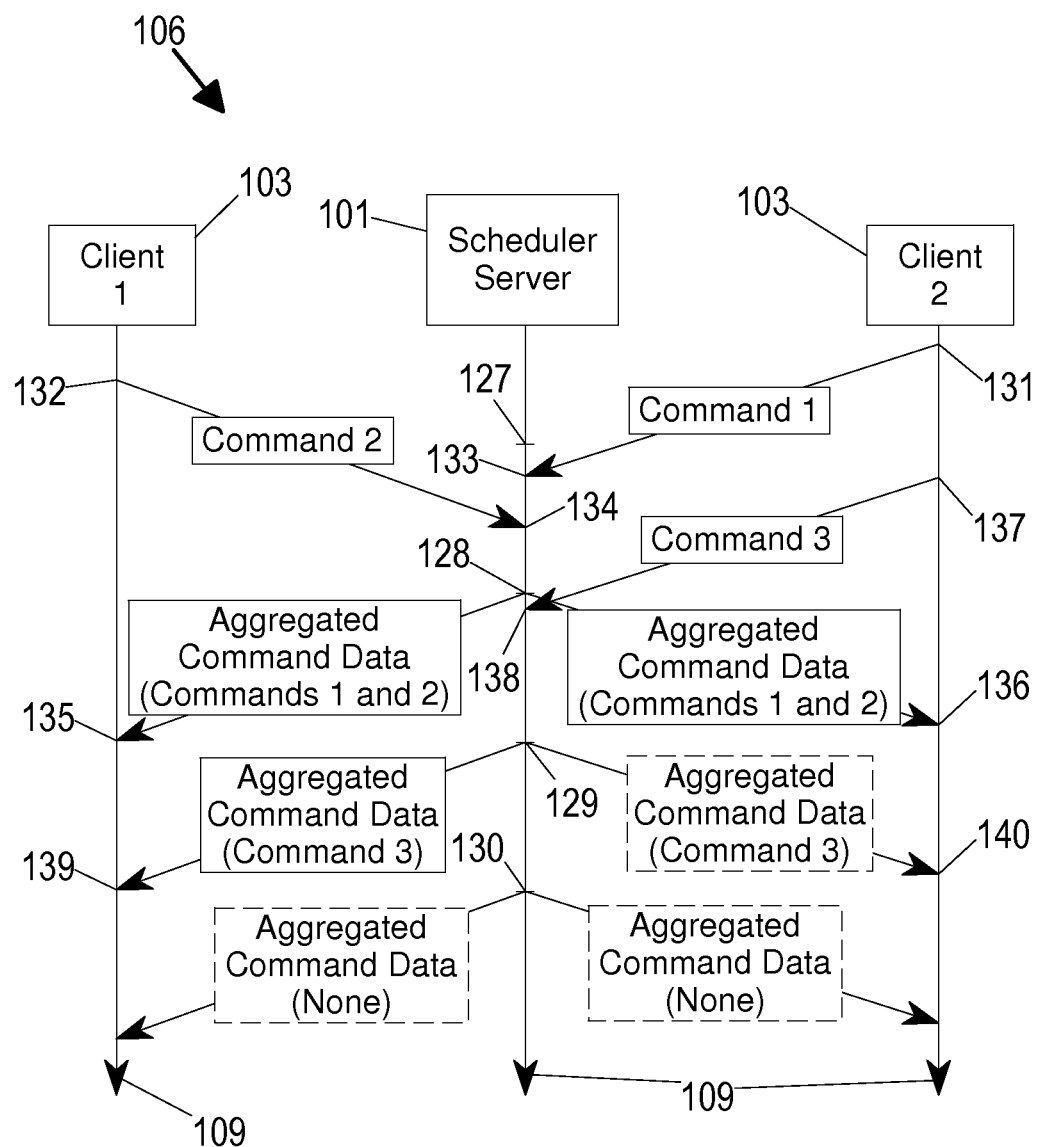

For the timeline diagram 106 of FIG. 4, the scheduler server 101 and two clients 103 are shown communicating the command data for a game. In this example, regular time intervals are separated by time markers 127-130. In some embodiments, these time intervals are generally used for the scheduler server 101 to determine when to send the aggregated command data to the clients 103. One appropriate such time interval has been discovered to be about 100 milliseconds in length. However, it is understood that the present invention is not so limited. Other time interval lengths that result in an acceptable user game performance experience are also within the scope of the present invention. Additionally, time intervals of irregular lengths are also within the scope of the present invention.

In this example, the two clients 103 send command data (e.g. command 1 and command 2 representative of inputs received from their users) to the scheduler server 101 at times 131 and 132. The scheduler server 101 receives the command data at times 133 and 134, which are both within the first time interval between time markers 127 and 128. At the end of the first time interval (at time marker 128), the scheduler server 101 aggregates (if not already aggregated) the command data received during the preceding time interval and sends the aggregated command data (e.g. containing commands 1 and 2) to the clients 103, which receive the aggregated command data at times 135 and 136. In some embodiments, the scheduler server 101 aggregates the command data as it is received during a given time interval. Also, in some alternative embodiments, for each participating client 103, the scheduler server 101 may generate specific aggregate command data that does not include the commands sent by that client 103, since the client 103 already has this command data. Such embodiments may also require that the command data include timing data for each command in order for each client 103 to determine the order of the commands, whether received from the scheduler server 101 or generated by the client 103 itself. However, the work load of the scheduler server 101 to generate client specific aggregate command data (including timing data) may be relatively large compared to simply sending the same aggregate command data to every client 103.

Meanwhile, one of the clients 103 (on the right) sends new command data (e.g. command 3) to the scheduler server 101 at time 137. The scheduler server 101 receives the new command data at time 138, which is in the second time interval between time markers 128 and 129. At the end of the second time interval (at time marker 129), therefore, the scheduler server 101 sends new aggregated command data (containing command 3) to the clients 103, which receive the aggregated command data at times 139 and 140. (Alternatively, since the client 103 on the right is the only client 103 that sent command data to the scheduler server 101 for the second time interval, the contents of the aggregated command data is redundant to the client 103 on the right, so sending the aggregated command data to the client 103 on the right is optional. Network traffic can thus be reduced by not sending aggregated command data to any clients 103 for which the aggregated command data is entirely redundant.)

In this example, no command data is received by the scheduler server 101 during the third time interval between time markers 129 and 130. The sending of the aggregate command data simply to inform the clients 103 that there is no command data for this time interval is optional. Network traffic can be reduced in some embodiments by not sending a communication packet in this case.

Figure 5:
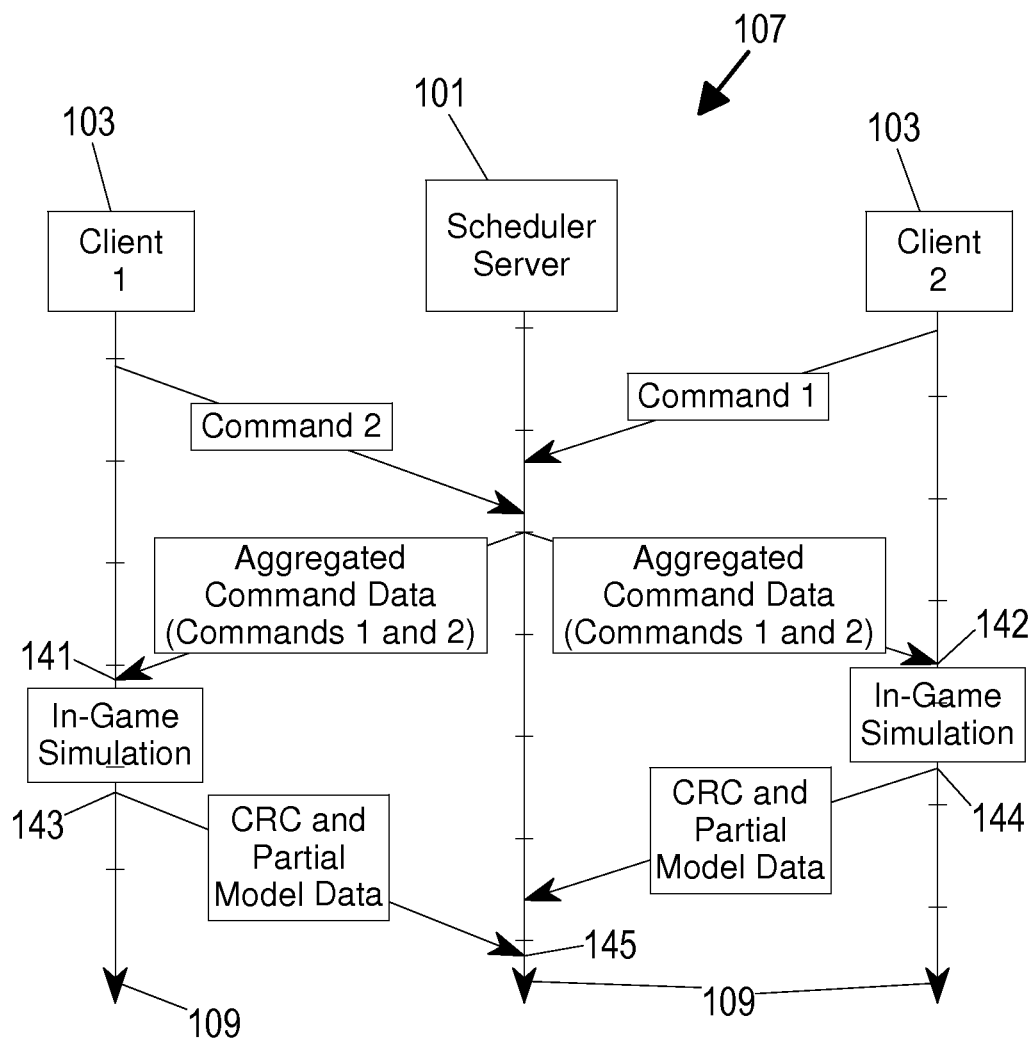

For the timeline diagram 107 of FIG. 5, the scheduler server 101 and two clients 103 are shown communicating the command data, the error-checking data and the partial model data with a similar description as that given above for FIGS. 3 and 4. In other words, FIG. 5 shows additional events or features involving some of the previous events of both FIGS. 3 and 4. For example, between receiving the aggregated command data (at times 141 and 142) and sending the CRC data and (optionally) the partial model data (at times 143 and 144), each client 103 performs the in-game simulation based on the aggregated command data (and any other inputs received from the user during this time). Additionally, in some embodiments, the scheduler server 101 must confirm that all participating clients 103 have been sent the aggregate command data for a given simulation step before performing the analysis of the CRC data or compiling the server world model for that step (e.g. at time 145).

Additionally, in some embodiments, events may occur within the clients 103 upon receiving inputs from the users or upon completing a simulation step at almost any time, so the clients 103 may generate and send any of the data (described above, but not shown in FIG. 5) at irregular time points without regard to regular time intervals, like those delineated by the time markers 127-130 in FIG. 4. In other embodiments, the clients 103 may save some or all of the data generated within a given time interval until the end of the time interval and then send it all together. In this manner, network traffic can be economized, though game performance may be compromised.

Figure 6:
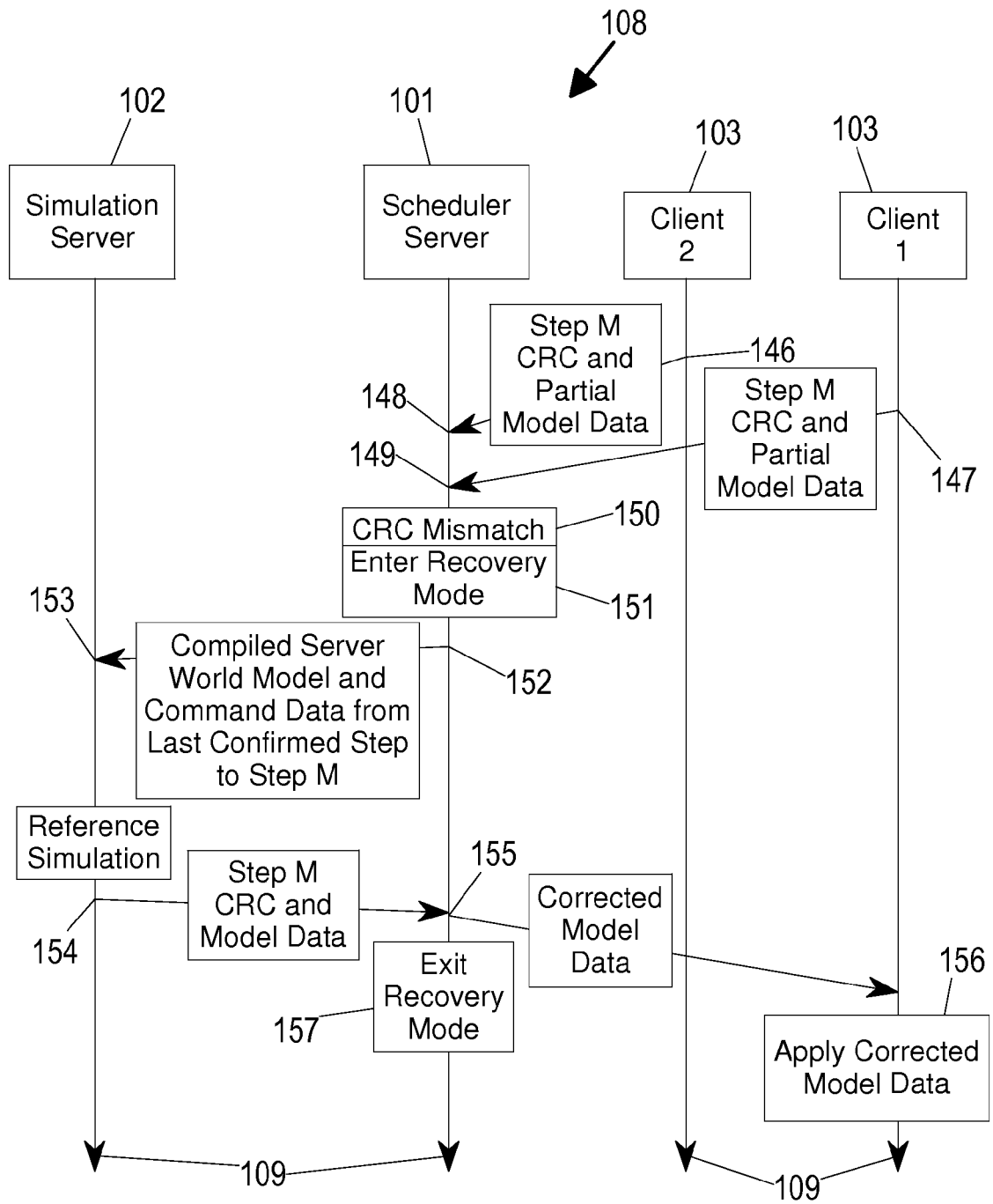

For the timeline diagram 108 of FIG. 6, the scheduler server 101, the simulation server 102 and two clients 103 are shown communicating some of the various types of data described above. In this example, the clients 103 have completed in-game simulations for step M, so the clients 103 generate and send the CRC data and the partial model data at times 146 and 147. The scheduler server 101 receives the CRC data and the partial model data at times 148 and 149. The scheduler server 101 then analyzes the CRC data and determines (at time 150) that there is a mismatch in this example, indicating that a simulation error has occurred within or been caused by at least one of the clients 103. Therefore, the scheduler server 101 enters a recovery mode at time 151.

In the recovery mode, the scheduler server 101 stops aggregating the command data, since any command data received during this time will be rendered superfluous by the upcoming reference simulation, which will eventually lead to resetting the in-game simulations of the clients 103 to a simulation step that precedes the steps at which any new command data is generated. Therefore, in some embodiments, the command data received during the recovery mode is deleted. However, an alternative to deleting all received command data during the recovery mode is to store the command data until the failed clients 103 have been determined. Then the scheduler server 101 may delete only the command data received from the failed clients 103, aggregate the remaining command data and send the aggregated command data to the clients 103. Additionally, in some embodiments, the scheduler server 101 informs the clients 103 of the recovery mode in order to prevent command data from being sent when it is unnecessary, thereby potentially reducing network traffic.

Also in the recovery mode, the scheduler server 101 initiates a reference simulation and sends (at time 152) the latest compiled server world model and the command data (and optionally the partial model data) for simulation steps between the simulation step for which the server world model was compiled and the current simulation step (i.e. step M). Upon receiving this data at time 153, the simulation server 102 begins the reference simulation. From the results of the reference simulation, the simulation server 102 generates (at time 154) the correct CRC data and correct model data that the clients 103 should have sent. (Alternatively, the simulation server 102 sends the results of the reference simulation to the scheduler server 101 for the scheduler server 101 to generate the correct CRC data and correct model data.) With the correct CRC data, the scheduler server 101 identifies which one or more of the clients 103 (the failed clients 103) caused or performed the simulation error and sends (at time 155) the corrected model data to the failed client(s) 103 for the failed client(s) 103 to apply (at time 156) the corrected model data to correct and reset its in-game simulation or the state of its client world model to the correct state for step M. The failed client(s) 103 can then resume their in-game simulations.

Additionally, after sending the corrected world model, the scheduler server 101 exits the recovery mode at time 157. In some embodiments, the scheduler server 101 may also immediately send aggregate command data (not shown) received during the recovery mode from the clients 103 that did not have the simulation error. In any case, functions described above with respect to FIGS. 3, 4 and 5 are resumed.

In some embodiments, the partial model data is preferably sent often enough that the scheduler server 101 can keep its compiled server world model sufficiently up to date so that a reference simulation doesn't take too long. There is a tradeoff in workload and user game experience, however, related to the frequency of sending the partial model data. For example, if the scheduler server 101 updates or compiles its server world model more often, then any reference simulation will take less time, since fewer simulation steps and less command data (and optionally partial model data) have to be accounted for in the reference simulation to reach the true or correct state for the server world model. Since the reference simulations take less time in this scenario, the users experience a quicker, shorter corrective jump in their game play when their client 103 applies the corrected model data to the in-game simulation. This user experience is preferable. However, if the partial model data is sent less often, so the scheduler server 101 updates or compiles its server world model less often, then even though a reference simulation will take more time, the combined workload of the scheduler server 101 and the simulation server 102 together may be beneficially reduced. For some embodiments, the frequency of sending the partial model data may be set after empirically determining how often a simulation error is likely to occur and how big of a corrective jump most users are willing to accept during game play. In other embodiments, the frequency of sending the partial model data may be dynamically set and reset during game play, resulting in a higher sending frequency when simulation errors or corrective jumps occur more often (or when a corrective jump has recently occurred) and a lower sending frequency when simulation errors occur less often. In this manner, overall server workload is reduced whenever possible and increased only when necessary.

Figure 7:
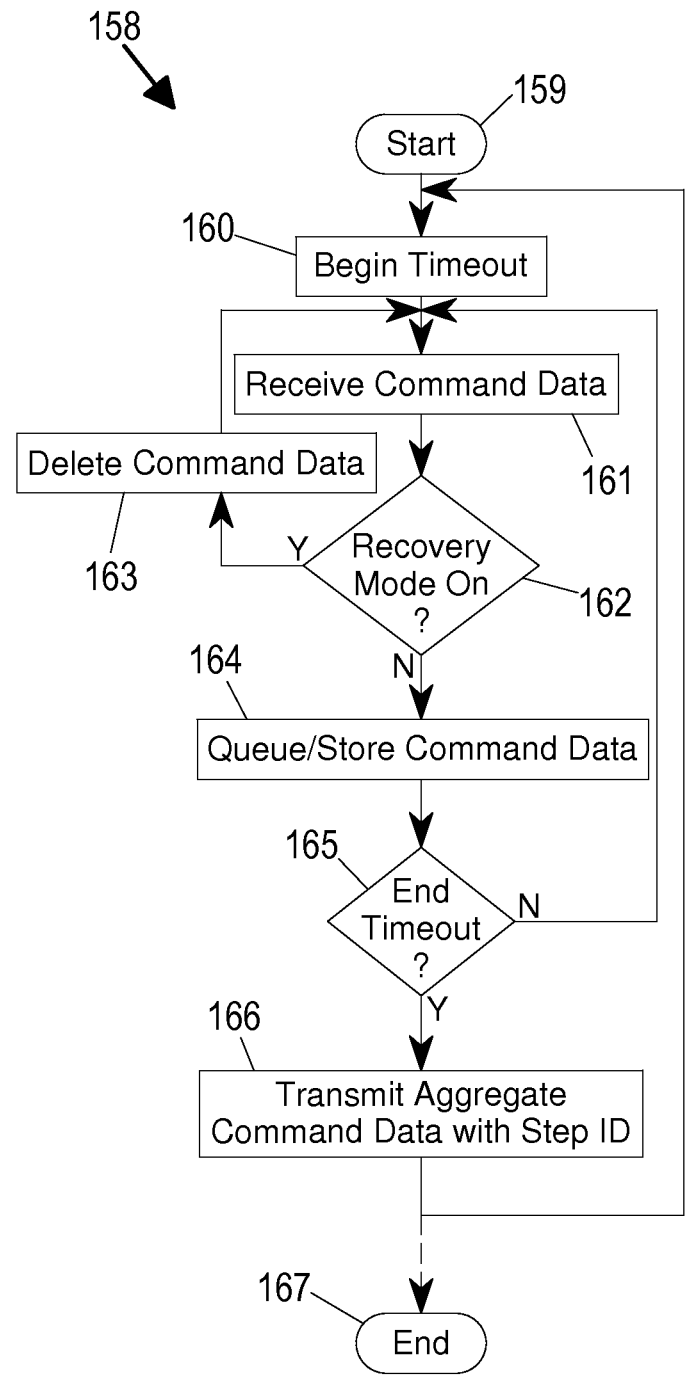
FIG. 7 is a simplified flowchart of an example process for a server within the example client-server system shown in FIG. 1, according to an embodiment of the present intention.

FIG. 7 shows a flowchart for an example procedure 158 for the scheduler server 101 to handle incoming command data in accordance with an embodiment of the present invention. It is understood, however, that the specific procedure 158 is shown for illustrative purposes only and that other embodiments (in addition to specifically mentioned alternative embodiments) may involve other procedures or multiple procedures with other individual functions or a different order of functions and still be within the scope of the present invention.

Upon starting (at 159), the scheduler server 101 begins (at 160) a timeout period (or alternatively, queries a clock and records the current time.) Upon receiving (at 161) command data from one or more of the clients 103, the scheduler server 101 determines (at 162) whether the recovery mode is on, indicating that the reference simulation and accompanying functions are being performed to identify and correct a failed client 103. If so, then the received command data is deleted (at 163). (Alternatively, the command data is stored until it has been determined whether it came from a failed client 103 and deleted only if true.) If the scheduler server 101 is not in the recovery mode (as determined at 162), then the scheduler server 101 queues, stores, collects or aggregates the received command data (at 164). If the timeout period has not ended or the desired length of time has not passed (determined at 165), then the scheduler server 101 repeats 161-165. On the other hand, if the timeout period has ended or the desired length of time has passed (as determined at 165), then the scheduler server 101 transmits the aggregated command data along with a corresponding step 1D to the clients 103. The scheduler server 101 then preferably continues back at 160 for another timeout period. (Optionally, the procedure 158 may be ended at 167.)

Figure 8:
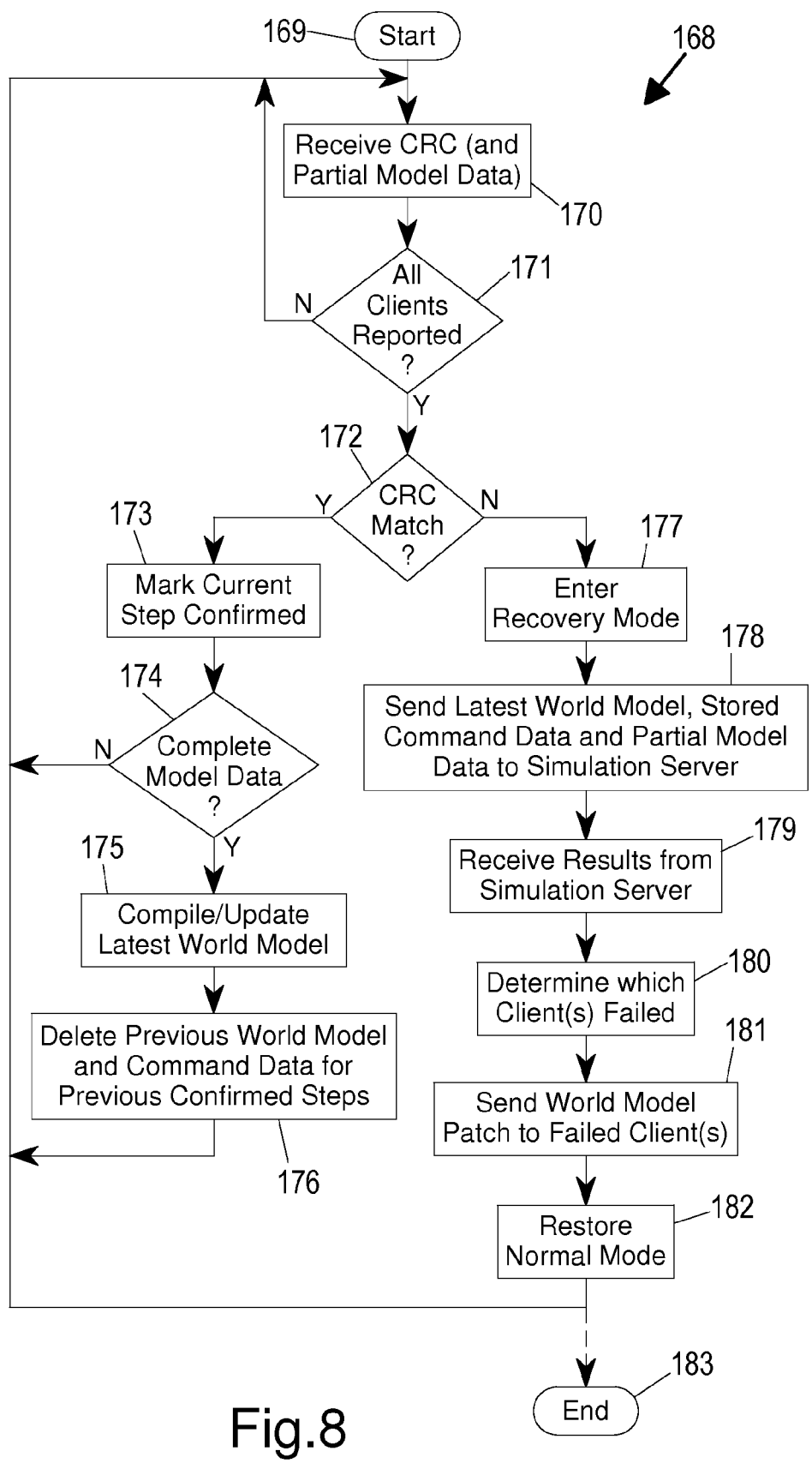
FIG. 8 is a simplified flowchart of another example process for a server within the example client-server system shown in FIG. 1, according to an embodiment of the present intention.

FIG. 8 shows a flowchart for an example procedure 168 for the scheduler server 101 to handle and respond to incoming error-checking (e.g. CRC) data and partial model data in accordance with an embodiment of the present invention. It is understood, however, that the specific procedure 168 is shown for illustrative purposes only and that other embodiments (in addition to specifically mentioned alternative embodiments) may involve other procedures or multiple procedures with other individual functions or a different order of functions and still be within the scope of the present invention.

Upon starting (at 169), the scheduler server 101 the scheduler server 101 receives (at 170) the error-checking data and (usually less often) the partial model data from one or more of the clients 103. If not all the clients 103 have reported this data for the same simulation step (determined at 171), then the scheduler server 101 repeats 170. Once all the clients 103 have reported this data for the same simulation step (as determined at 171), then the scheduler server 101 analyzes the error-checking data to determine (at 172) whether all of this data matches. If the error-checking data matches, then the current simulation step is marked as confirmed (at 173). If any partial model data was also received, thus completing the receipt of such data from all of the clients 103 for the same simulation step (determined at 174), then the scheduler server 101 compiles or updates (at 175) its latest server world model and deletes (at 176) the command data queued for previous confirmed steps and the previous server world model and partial model data, if any. Upon completing 175 and 176 or if the determination at 174 was negative, then the scheduler server 101 returns to 170 to repeat the foregoing.

If the error-checking data did not all match (as determined at 172), the scheduler server 101 enters the recovery mode at 177. The latest compiled server world model, the stored command data and (optionally) the partial model data are sent (at 178) to the simulation server 102 for the simulation server 102 to perform the reference simulation. After the scheduler server 101 receives (at 179) the results from the simulation server 102, the scheduler server 101 determines (at 180) which one or more of the clients 103 failed or caused a simulation error. The scheduler server 101 then sends (at 181) the world model patch or corrected world model to the failed client(s) 103. The normal mode is then restored or the recovery mode is exited at 182, and the scheduler server 101 preferably returns to 170 to repeat the foregoing. (Optionally, the procedure 168 may be ended at 183.)

Figure 9:
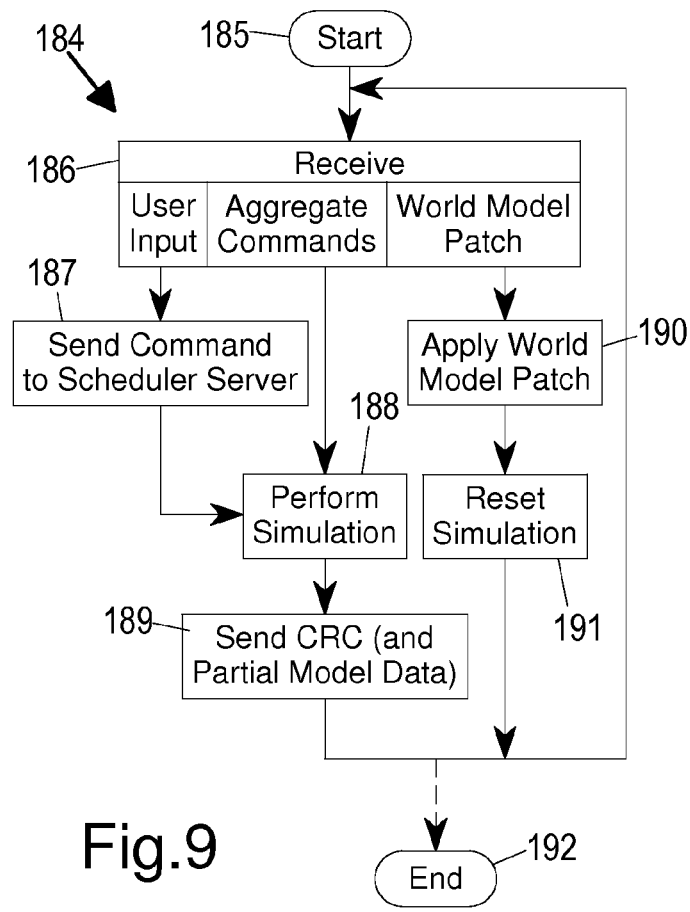
FIG. 9 is a simplified flowchart of an example process for a client within the example client-server system shown in FIG. 1, according to an embodiment of the present intention.

FIG. 9 shows a flowchart for an example procedure 184 for each of the clients 103 to handle incoming data. It is understood, however, that the specific procedure 184 is shown for illustrative purposes only and that other embodiments (in addition to specifically mentioned alternative embodiments) may involve other procedures or multiple procedures with other individual functions or a different order of functions and still be within the scope of the present invention.

Upon starting (at 185), the client 103 receives (at 186) the user input, the aggregate command data or the world model patch. Upon receiving the user input (at 186), the client 103 generates an appropriate command data packet and sends it to the scheduler server 101 (at 187). The client 103 performs (at 188) its in-game simulation using the command based on the user input. On the other hand, the client 103 performs (at 188) its in-game simulation using the aggregate command data upon receiving the aggregate command data (at 186). After performing the in-game simulation, the client 103 generates the appropriate error-checking (e.g. CRC) data and (optionally) the partial model data and sends (at 189) this data to the scheduler server 101. Upon receiving the world model patch or corrected model data (at 186), the client 103 applies (at 190) the world model patch to correct its in-game simulation or state of its client world model. The client 103 then resets (at 191) the in-game simulation to the simulation step indicated with the received world model patch. Upon sending the error-checking data (at 189) or resetting the in-game simulation (at 191), the client 103 preferably returns to 186 to repeat the foregoing. (Optionally, the procedure 184 may be ended at 192.)

Figure 10:
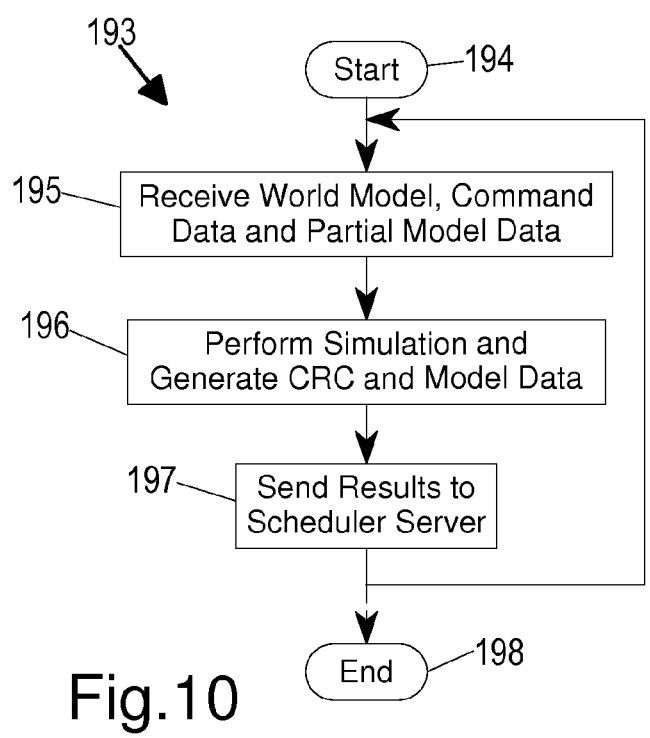
FIG. 10 is a simplified flowchart of another example process for a server within the example client-server system shown in FIG. 1, according to an embodiment of the present intention.

FIG. 10 shows a flowchart for an example procedure 193 for the simulation server 102 to handle the reference simulation activities. It is understood, however, that the specific procedure 193 is shown for illustrative purposes only and that other embodiments (in addition to specifically mentioned alternative embodiments) may involve other procedures or multiple procedures with other individual functions or a different order of functions and still be within the scope of the present invention.

Upon starting (at 194), the simulation server 102 receives (at 195) the latest compiled server world model, the command data and (optionally) the partial model data from the scheduler server 101. At 196, the simulation server 102 performs the reference simulation and generates the correct CRC and world model data. At 197, the simulation server 102 sends the results to the scheduler server 101. The simulation server 102 then preferably returns to 195 to wait for the next reference simulation to begin or ends the procedure 193 at 198.

Some embodiments of the present invention involve one or more of the structures and/or methods described above. Additionally, some embodiments of the present invention involve a non-transitory computer-usable or computer-readable storage medium (the storage medium) on which is stored computer-readable program code or instructions (the program) adapted to be executed (e.g. by a computerized device, processing unit or other appropriate machine or combination of machines) to implement or perform one or more of the methods described above. The storage medium may be any appropriate article that may be sold through a storefront or by mail order. The storage medium may alternatively be within or connected to a server from which the program can be downloaded. Furthermore, the storage medium may also be within or connected to a user's computer, into which the user may have loaded or downloaded the program.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention. Thus, it is intended that the present subject matter covers such modifications and variations as come within the scope of the appended claims and their equivalents.

What is claimed is:

1. In a client-server game system, a method comprising:
 a server receiving through a network error-checking data associated with a plurality of clients that are participating in a game through the network;
 the server analyzing the error-checking data to determine whether a simulation error has been caused by at least one of the clients while participating in the game; and
 upon determining that the simulation error has been caused, the server a) causing a reference simulation to be performed, b) based on the results of the reference simulation, identifying one or more of the clients that caused the simulation error, and c) sending a patch through the network to the one or more clients that caused the simulation error for the one or more clients to correct and reset an in-game simulation.

2. The method of claim 1, further comprising:
 upon determining that the simulation error has been caused, the server causing the reference simulation to be performed in accordance with a compiled server world model and additional data for simulation steps that follow a latest simulation step for which the server world model has been compiled.

3. The method of claim 2, further comprising:
 the server receiving through the network a plurality of commands from the clients, the commands being used by the clients to perform the in-game simulation, and the commands forming at least a portion of the additional data.

4. The method of claim 3, further comprising:
the server receiving through the network partial model data from the clients, the partial model data from each client being indicative of at least a part of a client world model simulated by the client, and the partial model data forming at least another portion of the additional data.

5. The method of claim 3, further comprising:
before causing the reference simulation to be performed, the server entering a recovery mode;
after sending through the network the patch to the one or more clients that caused the simulation error, the server exiting the recovery mode;
after receiving through the network at least one command from at least one of the clients, the server storing the received command if not in the recovery mode, and the server deleting the received command if in the recovery mode; and
the server periodically sending through the network the stored commands to the clients for each of the clients to perform the in-game simulation in accordance with the commands.

6. The method of claim 1, further comprising:
upon determining that the simulation error has not been caused by any of the clients in a current simulation step, the server confirming the current simulation step.

7. The method of claim 6, further comprising:
upon determining that the simulation error has not been caused, the server compiling a server world model for a latest simulation step for which all preceding simulation steps have been confirmed.

8. The method of claim 6, further comprising:
the server receiving through the network partial model data from the clients, the partial model data from each client being indicative of at least a part of a client world model simulated by the client;
upon determining that the simulation error has not been caused, the server compiling a server world model for a latest simulation step for which all preceding simulation steps have been confirmed and for which the partial model data has been received from all clients.

9. The method of claim 8, further comprising:
upon compiling the server world model, the server deleting confirmed simulation steps, partial model data and compiled server world models, if any have been stored, that precede the latest simulation step for which the server world model has been compiled.

10. The method of claim 1, wherein:
the analyzing further comprises comparing the error-checking data received through the network from each client to determine whether all of the error-checking data matches, a mismatch indicating the simulation error by the one or more clients in a current simulation step.

11. In a client-server game system, a method comprising:
a client, which has a display and a control device and is connected to a network and is one of a plurality of clients participating in a game through the network, performing an in-game simulation and presenting the in-game simulation through the display;
the client generating error-checking data based on results of the in-game simulation;
the client sending the error-checking data through the network to a server for the server to analyze the error-checking data to determine whether at least one of the plurality of clients has generated a simulation error, to identify which one or more of the plurality of clients generated the simulation error, and to generate a patch for correcting the simulation error; and
upon receiving the patch from the server through the network, the client applying the patch to correct and reset the in-game simulation.

12. The method of claim 11, further comprising:
the client sending command data through the network to the server for the server to generate aggregate command data from command data received by the server through the network from the plurality of clients;
the client receiving the aggregate command data through the network from the server; and
upon receiving the aggregate command data, the client performing the in-game simulation in accordance with the aggregate command data and presenting the in-game simulation through the display.

13. The method of claim 11, wherein:
the error-checking data is sent through the network to the server for the server, after determining that the simulation error has been generated, to cause a reference simulation to be performed to determine a correct state of a server world model for the game and to identify which one or more of the plurality of clients generated the simulation error based on the correct state of the server world model.

14. The method of claim 13, further comprising:
the client sending partial model data through the network to the server to be used in the reference simulation, the partial model data being indicative of at least a part of a client world model simulated by the client.

15. The method of claim 14, wherein:
the partial model data is sent through the network to the server also for the server to compile a confirmed version of the server world model from partial model data received by the server through the network from the plurality of clients and for the server to use the confirmed version of the server world model in the reference simulation.

16. A computer-readable program stored on a non-transitory computer-readable medium, the program, when executed by a computer, causing the computer to perform a method comprising:
the computer, which is a client in a client-server game system, performing an in-game simulation for a networked computerized game, the computer being connected to a network, the computer being one of a plurality of clients participating in the game via the network, the computer having a display and a control device, the in-game simulation being for presentation through the display to a user when the user is playing the game by manipulating the control device;
the computer generating error-checking data based on results of the in-game simulation;
the computer sending the error-checking data through the network to a server for the server to analyze the error-checking data to determine whether at least one of the plurality of clients has generated a simulation error, to identify which one or more of the plurality of clients generated the simulation error, and to generate a patch for correcting the simulation error; and
upon receiving the patch from the server through the network, the computer applying the patch to correct and reset the in-game simulation and presenting the corrected in-game simulation through the display.

17. The computer-readable program of claim 16, wherein the method further comprises:

the computer generating command data in response to the user manipulating the control device;

the computer sending the command data through the network to the server for the server to generate aggregate command data from command data received by the server through the network from the plurality of clients;

the computer receiving the aggregate command data through the network from the server; and upon receiving the aggregate command data, the computer performing the in-game simulation in accordance with the aggregate command data and presenting the in-game simulation through the display.

18. The computer-readable program of claim 16, wherein according to the method:

the error-checking data is sent through the network to the server for the server, after determining that the simulation error has been generated, to cause a reference simulation to be performed to determine a correct state of a server world model for the game and to identify which one or more of the plurality of clients generated the simulation error based on the correct state of the server world model.

19. The computer-readable program of claim 18, wherein the method further comprises:

the computer sending partial model data through the network to the server to be used in the reference simulation, the partial model data being indicative of at least a part of a client world model simulated by the computer.

20. The computer-readable program of claim 19, wherein according to the method:

the partial model data is sent through the network to the server also for the server to compile a confirmed version of the server world model from partial model data received by the server through the network from the plurality of clients and for the server to use the confirmed version of the server world model in the reference simulation.

* * * * *